United States Patent [19]

Houston et al.

[11] Patent Number: 4,809,804
[45] Date of Patent: Mar. 7, 1989

[54] COMBINATION WHEELCHAIR AND WALKER APPARATUS

[75] Inventors: Thomas T. Houston, Erie; Raymond H. Metzger, Wheat Ridge, both of Colo.

[73] Assignee: Falcon Rehabilitation Products, Inc., Commerce City, Colo.

[21] Appl. No.: 936,078

[22] Filed: Nov. 28, 1986

Related U.S. Application Data

[63] Continuation-in-part of Ser. No. 899,890, Aug. 19, 1986.

[51] Int. Cl.[4] .......................... B60K 1/02; B60K 7/00; A61G 5/00
[52] U.S. Cl. ................................... 180/65.5; 180/907; 280/304.1; 297/DIG. 4; 297/DIG. 10; 297/330; 5/81 R
[58] Field of Search .............. 280/242 WC, 289 WC; 297/DIG. 4, DIG. 10, 5, 330, 332, 337; 180/65.1, 65.5, 907, 15; 5/81 R

[56] References Cited

U.S. PATENT DOCUMENTS

| | | | |
|---|---|---|---|
| 2,168,424 | 8/1939 | Skinner et al. | 297/6 |
| 3,872,945 | 3/1975 | Hickman et al. | 180/907 |
| 3,968,991 | 7/1976 | Maclaren | 280/242 WC |
| 4,053,025 | 10/1977 | Slusarenko | 180/15 |
| 4,054,319 | 10/1977 | Fogg, Jr. et al. | 297/DIG. 4 |
| 4,190,263 | 2/1980 | Powers | 280/242 WC |
| 4,456,086 | 6/1984 | Wier et al. | 180/907 |
| 4,592,570 | 6/1986 | Nassiri | 280/289 WC |

FOREIGN PATENT DOCUMENTS 2545718 11/1984 France ................ 280/289 WC

OTHER PUBLICATIONS

Levo from Amigo Los Angeles, Inc., "Rise to New Challenges".
Exercise and Standing made Easy by Stand Aid of Iowa, Inc. "Standing With Class", Spring 1988.
The New Rehab Chair by Applied Scientific Knowledge, Inc.

*Primary Examiner*—David M. Mitchell
*Assistant Examiner*—Brian L. Johnson
*Attorney, Agent, or Firm*—Sheridan, Ross & McIntosh

[57] ABSTRACT

A wheelchair apparatus is disclosed and includes a frame having a base portion and spaced side portions to define a space for receiving an operator's body. A device is provided for supporting the frame above a ground surface for movement therealong and includes a mechanism for moving the apparatus over the ground surface. A device is provided to permit an operator within the space to control movement of the apparatus along a ground surface. Finally, a seat assembly supports and selectively moves an operator between a fully seated position and a substantially upright position within the apparatus to permit the operator to control and move the apparatus over the ground surface from both the fully seated position as well as the substantially upright position.

16 Claims, 12 Drawing Sheets

COMBINATION WHEELCHAIR AND WALKER APPARATUS

RELATED APPLICATION

This is a continuation-in-part of U.S. Pat. application Ser. No. 06/899,890, filed Aug. 25, 1986, by Tom T. Houston and Raymond H. Metzger, the contents of which are specifically incorporated herein by reference.

BACKGROUND OF THE INVENTION

1. Field of the Invention

This invention relates to wheelchair devices and wheeled walker devices for assisting handicapped individuals to move about and, more particularly, to powered wheelchairs and walkers operable by the user or occupant thereof. Specifically, the present invention relates to a wheelchair/walker combination which is adapted to permit the occupant to operate and move the device in a fully sitting position and to rise to an upright position without lower body muscular effort on the part of the handicapped occupant and to also operate and move the device from such an upright position.

2. Description of the Prior Art

Wheelchairs of various types and designs have been utilized for a considerable period of time for the purpose of transporting physically handicapped individuals having limited or no use of their legs, such as paraplegics and quadriplegics. Wheelchair designs have become quite sophisticated as a result of efforts intended to enable handicapped individuals to have a degree of control over their own movements. Thus, powered wheelchairs have incorporated a wide variety of control and safety devices to assist the handicapped operator thereof to achieve relatively independent movement and transportation. A major disadvantage with wheelchairs in general, however, is that such devices, while assisting handicapped individuals in moving about an area, restrict such individuals to a relatively rigid sitting position within the chair which causes continual pressure contact on the same areas of the body. This can lead to serious problems including skin and tissue degeneration, gangrene and the like. In the case of children, lack of weight bearing on the legs can cause growth defects including leg shortness.

Walker devices were designed to overcome some of the aforementioned problems relating to wheelchairs. It has been shown that devices which enable a handicapped individual to remain in a standing position for relatively long periods of time (e.g. 2 or more hours), provide substantial advantages and benefits to handicapped individuals. More specifically, passive standing has been shown to produce beneficial physiological effects which include reduction of bone and calcium loss, reduction of hypercalciuria and urinary calculi, increased muscular tone and maintenance of range of motion, improved orthostatic circulatory regulation, and increased bladder pressure. In addition, substantial psychological benefits result from permitting physically handicapped individuals to remain in a standing position. Such standing positions provide increased independence and morale as well as permit the handicapped individual to position himself so as to be able to work at various working stations. Consequently, walker devices of various types have been developed to permit the handicapped individual to remain in a standing position for periods of at least several hours at a time.

Walkers present a number of problems which are not encountered in wheelchair designs. Such problems arise in part from the fact that a user's body extends substantially above the center of gravity of the walker, thereby leading to the possibility of tipping over. If a walker is designed with a relatively large base area to avoid the tipping problem, maneuverability of the walker is restricted. Additionally, it becomes more difficult to provide support for the user of the walker. Also, movement into a walker is generally much more diffucult than transferring to a wheelchair since the user must not only transfer to the device, but must also achieve a standing position, and many users of such devices have no leg control or use whatsoever.

Early walker devices such as illustrated in U.S. Pat. No. 2,168,424 are useful although they have numerous problems and deficiencies. Most particularly is the fact that such early devices require the handicapped operator of the device to utilize his own muscular arm power to maneuver the device about a room or a ground surface area. Thus, the usefulness of the device was dependent entirely on the physical capability and strength of the user.

Powered walker devices were developed which overcame the aforementioned deficiency. Such power devices, as illustrated in U.S. Pat. No. 3,872,945, enable the user to stand within the walker and maneuver and move about an area utilizing a battery power pack or the like carried on the walker itself. This particular patent discloses such a device which enables the user to be highly maneuverable in an area.

Many power walker devices have a rear entryway and carry the power pack and other apparatus up front. These designs limit the distance which the operator of the walker may reach forwardly of the walker and thereby restrict usefulness when working at a table or other work space positioned in front of the walker. Thus, in such arrangements, an operator must preferably position himself sideways to a work area in order to provide close proximity thereto. This sideways orientation to a work area presents certain problems in terms of comfort of and flexibility to the user. The device illustrated in U.S. Pat. No. 3,872,945 overcomes this problem and enables the user to be stationed within the walker apparatus very close to the front thereof, thereby enabling the user to reach beyond the walker a significant distance.

A major problem inherent with all of the aforementioned powered walker designs, including that of U.S. Pat. No. 3,872,945, is that an individual must be assisted into the walker. Moreover, once an individual is positioned within these walkers, they must remain in a standing position. If an individual positioned within the walker wishes to be placed in a seated position, the individual must be entirely removed from the walker. Thus, these designs limit overall usefulness of the walker. Accordingly, there remains a need for a powered walker apparatus which is easy for a handicapped individual to enter and exit unassisted and which enables an operator to move freely from a sitting to a standing position, again unassisted. Furthermore, there remains a need for such a device that will preferably also function as a wheelchair thereby permitting the occupant to move above in a seated position as well and thereby obviate the need for transference between walker and wheelchair.

SUMMARY OF THE INVENTION

Accordingly, it is one object of the present invention to provide a wheelchair and walker device which enables the occupant thereof to freely and easily move from a sitting to a standing position therewithin without requiring leg muscle use or control and to operate the device from either a fully seated position as a wheelchair or a standing/upright position as a walker.

It is another object of the present invention to provide a walker apparatus that is designed to enable the user thereof to easily transfer unassisted to the apparatus in a sitting position.

It is still another object of the present invention to provide a powered wheelchair/walker apparatus which is designed to allow the occupant thereof to readily change weight distribution therewithin and without assistance.

It is a further object of the present invention to provide a wheelchair/walker apparatus which is easily movable about a ground surface and will not tilt nor lose traction over uneven terrain.

Yet another object of the present invention is to provide a powered walker wherein an occupant may easily move to adjacent working areas of varying heights which remain within easy reach of the occupant.

To achieve the foregoing and other objects and in accordance with the purpose of the present invention, a wheehchair apparatus is disclosed. The apparatus includes a frame having a base portion and space side portions to define a space for receiving an operator's body. A mechanism is provided for supporting the frame above a ground surface for movement therealong and includes a mechanism for moving the apparatus over the ground surface. An arrangement is provided to permit an operator within the space of the apparatus to control movement of the apparatus along the ground surface. Finally, a seat assembly mechanism supports and selectively moves an operator between a fully seated position and a substantially upright position within the apparatus to permit the operator to control and move the apparatus over the ground surface from both the fully seated and the substantially upright positions.

In an alternate embodiment, a walker apparatus is also disclosed and is arranged to permit an operator to readily move between a fully seated position and a fully upright position therewithin. The apparatus includes a frame assembly having a base portion and spaced side portions projecting upwardly from the base portion to define a space therebetween for receiving an operator's body and to further define a front entryway to permit ingress and egress from this space by the operator. A foot support is affixed to the base portion to provide support for the operator when in an upright, standing position within the apparatus. A mechanism is connected to the base portion for supporting the frame assembly above a ground surface for movement therealong. A power source provides power to the frame support and movement mechanism, and a control device interconnects the power source and the movement mechanism to permit the operator to control the movement of the apparatus along the ground surface. A gate arrangement selectively extends across the entryway to provide a closure mechanism when the operator is in the apparatus. Finally, a seat assembly is provided for supporting an operator when in a seated position within the apparatus as well as supporting the operator when in an upright position. The seat assembly includes a seat member and a seat control mechanism for selectively moving the seat member between a substantially horizontal position for carrying the operator in a seated position within the apparatus and a substantially vertical position for supporting the operator when the operator is in an upright position within the apparatus.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the illustrative and presently preferred embodiments as shown in the accompanying drawings in which:

DETAILED DESCRIPTION OF THE PREFERRED EMBODIMENTS

Figure 1:
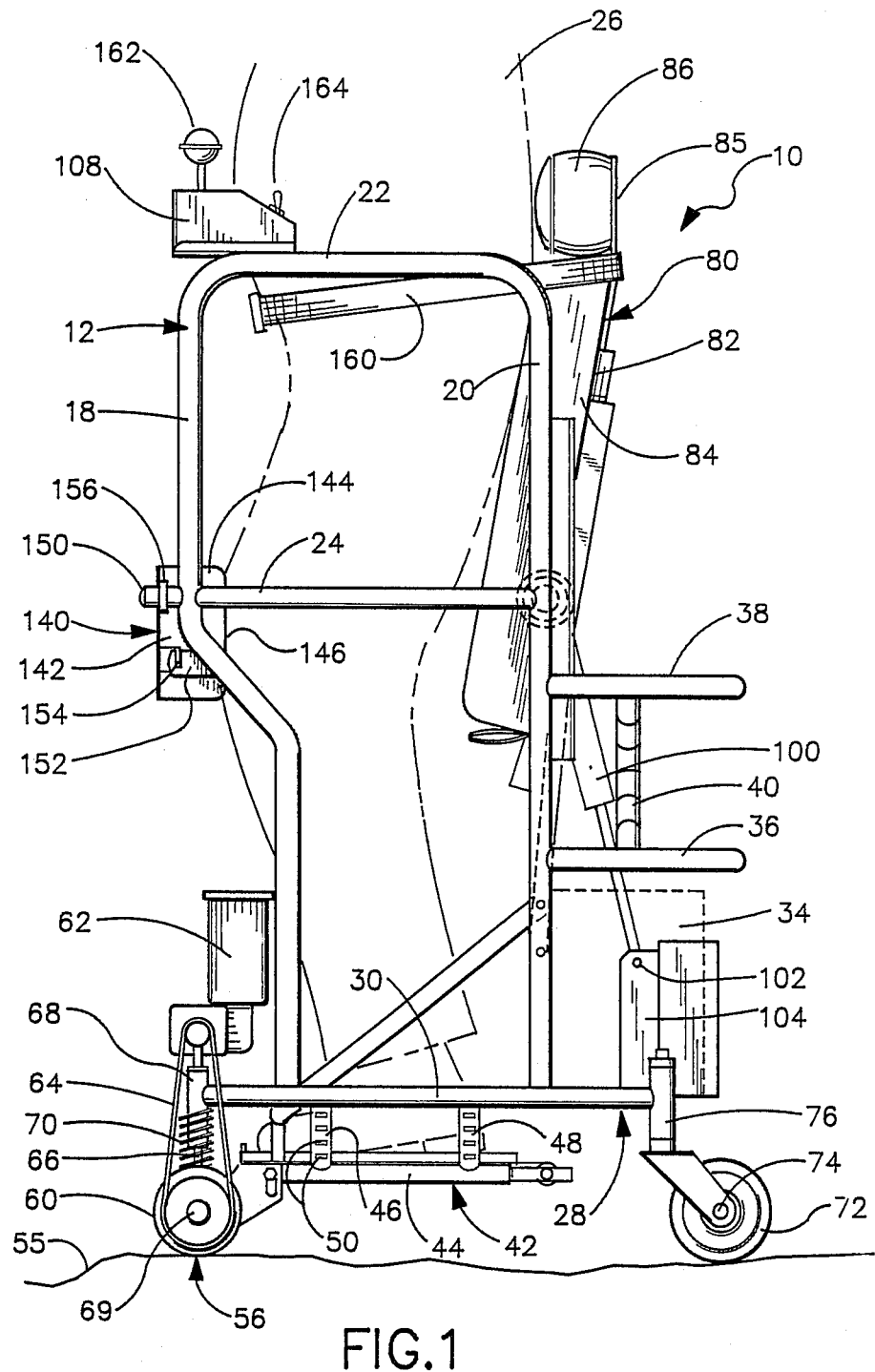
FIG. 1 is a side perspective view of a walker device of the present invention which illustrates an operator in shadow positioned therewithin in a fully upright position.
Figure 3:
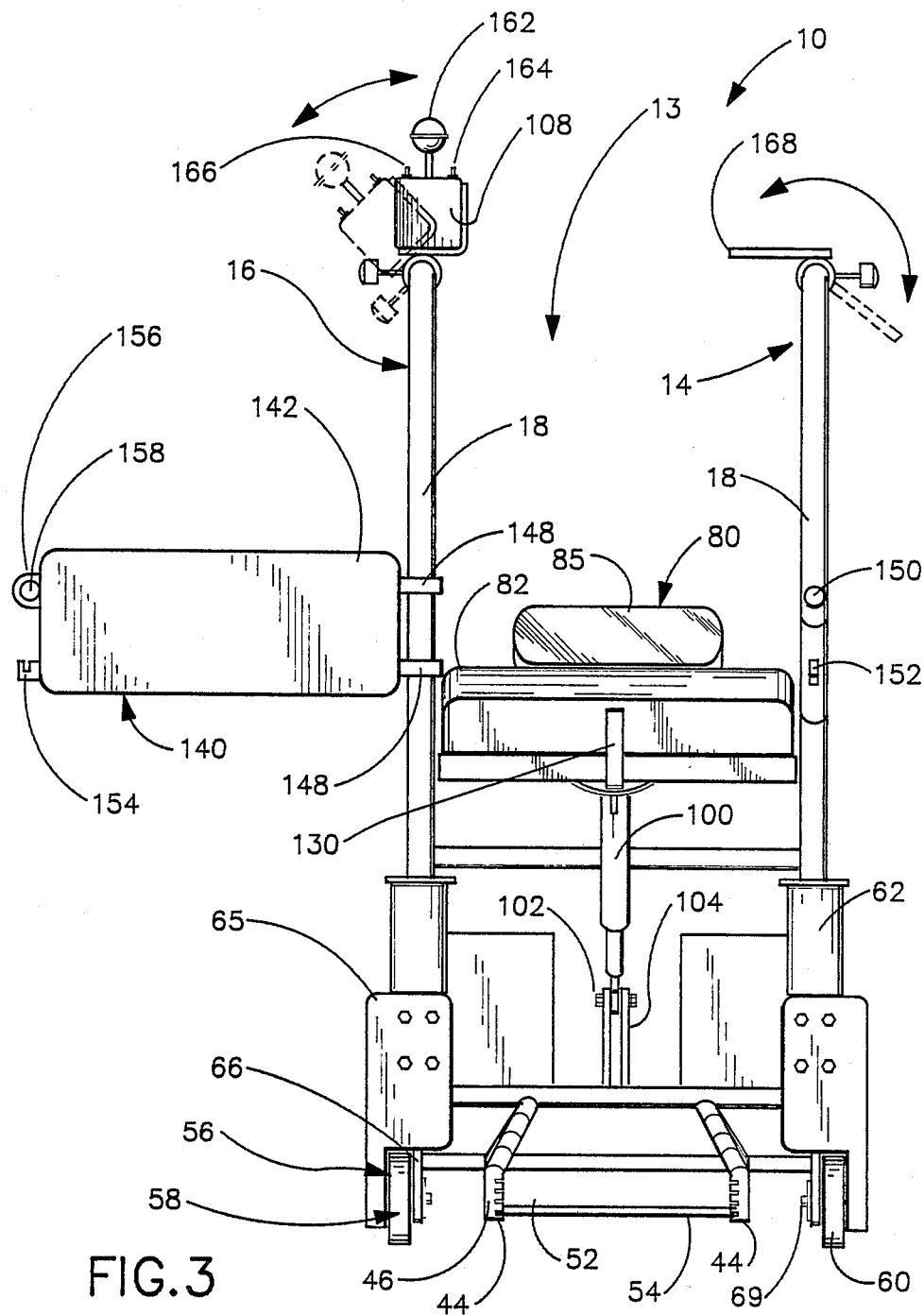
FIG. 3 is is a front view of the embodiment illustrated in FIG. 2.
Figure 4:
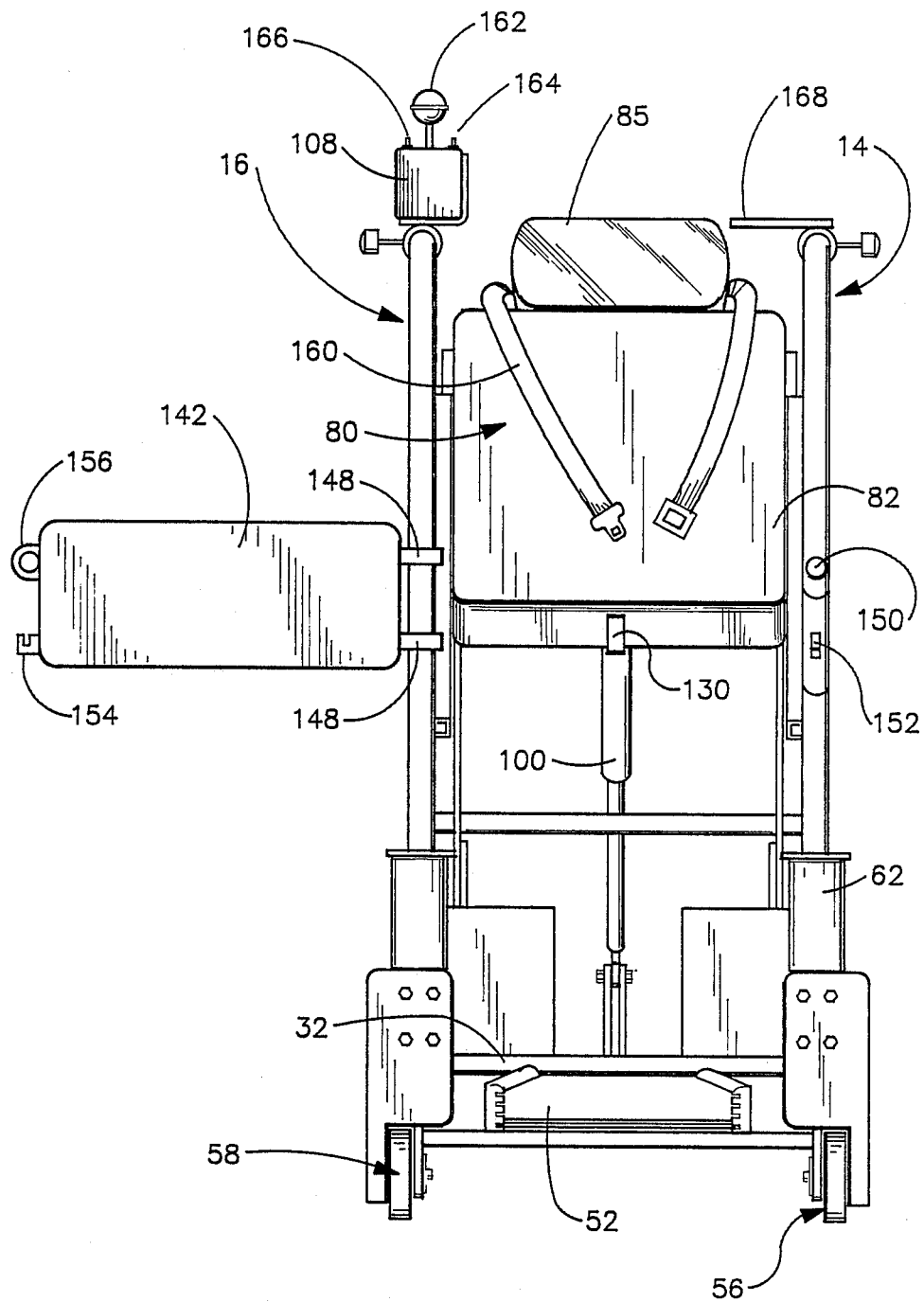
FIG. 4 is a front view of the embodiment illustrated in FIG. 1 with the gate mechanism thereof in a fully open position.

Referring initially to FIGS. 1 and 4, a motorized walker device 10 is illustrated. In preferred form, the walker 10 is motorized and includes a frame assembly 12 having a left side portion 14 and a right side portion 16 defining a front entryway 13 (see FIG. 3). Each of the side portions 14, 16 includes vertical front and rear posts 18, 20, respectively, which are interconnected, as by welding, by vertically spaced-apart side rails 22, 24. The upper side rail 22 functions in part as an arm support member for an operator 26 positioned within the device 10.

A base 28 is provided for carrying the frame assembly 12 in a vertical, upwardly projecting manner therefrom. In preferred form, the base 28 includes a pair of side bar members 30 which are connected, as by welding, to the bottoms of the vertical posts 18, 20 of each side portion 14, 16. The side bars 30 are interconnected by a rear cross bar 32 to form a rectangular-shaped base assembly 28. The rear portion of the base assembly 28 is preferably adapted to carry a power pack 34 which preferably is in the form a rechargeable battery well known in the power wheelchair industry. Power pack 34 provides electric power to the various motor units of the device 10 as described in greater detail below. It is envisioned, however, that other power means including manual arrangements may be utilized to operate the walker 10. Projecting from the rear of the paired rear vertical posts 20 are a pair of generally U-shaped bumper posts 36, 38 interconnected by vertical support members 40. These posts 36, 38 are designed to protect the rear of the device 10 as well as the power pack 34 by projecting from the rear of the device 10. The rigid U-shaped bars 36, 38 also assist in structurally interconnecting the left vertical side portion 14 with the right vertical side portion 16 to provide unitary strength to the frame assembly 12, the terms "left" and "right" being relative to the orientation of an occupant positioned within the device 10. However, the U-shape is also provided to permit easy movement of the seat assembly as described below.

Secured to the base assembly 28 and projecting downwardly therefrom is a foot support mechanism 42. In preferred form, the foot support mechanism 42 includes a pair of base or bottom bars 44 aligned beneath bars 30. Each of the bars 44 includes a pair of upwardly projecting posts 46, 48 secured thereto. Each of the posts 46, 48 are attached at their upper ends to the side bar members 30 and include a plurality of notches 50 which are aligned for receiving a foot tray 52 therein. The plurality of notches 50 are aligned along posts 46, 48 so as to provide a plurality of horizontal planar positions in which the foot tray 52 may be maintained relative to the assembly 42. The tray 52 is vertically adjustable along the posts 46, 48 in accordance with height and comfort of the operator 26.

Figure 2:
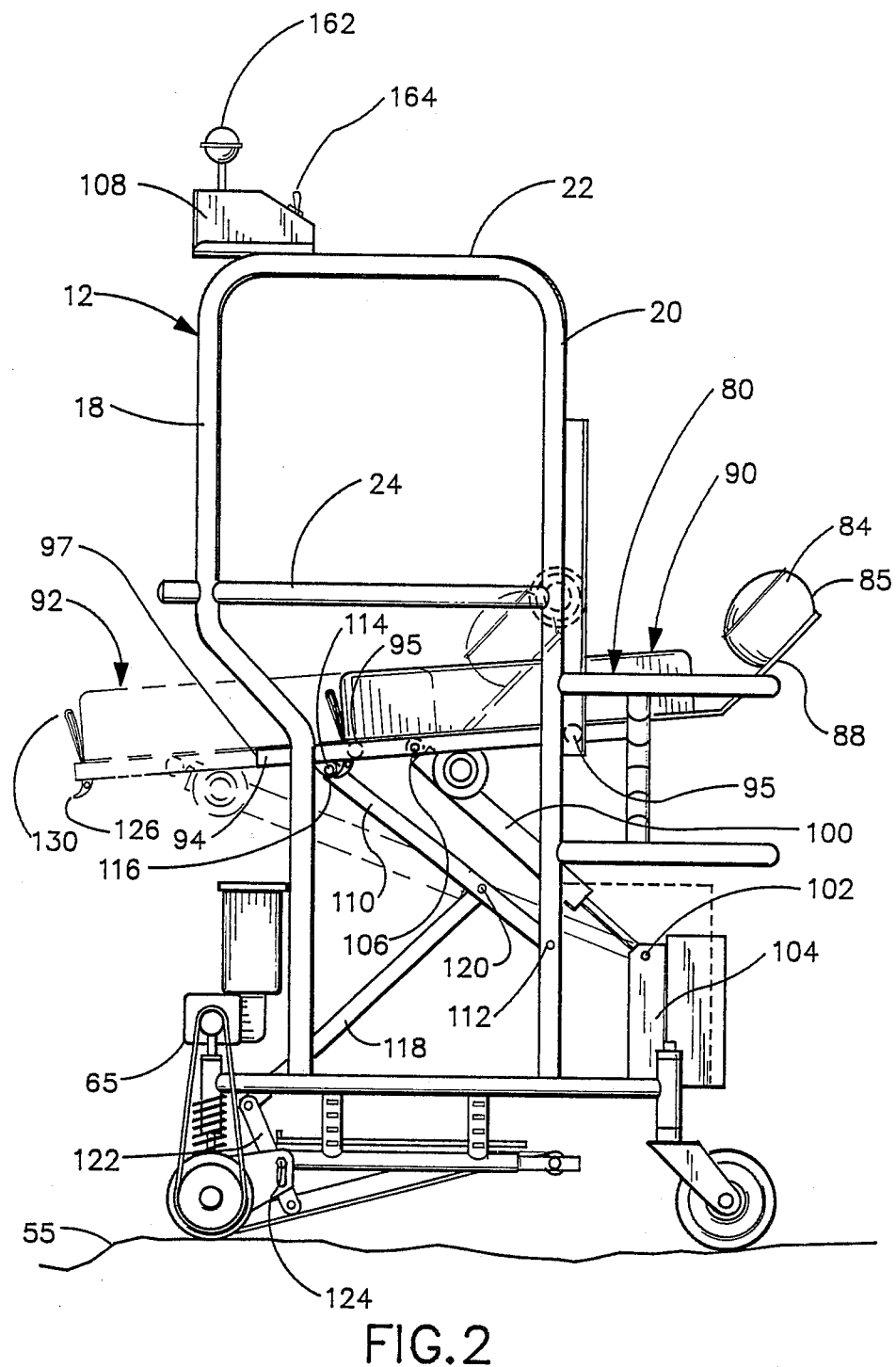
FIG. 2 is a side perspective view of the embodiment similar to FIG. 1 but illustrating the device in a seated position.

In one form of the invention illustrated in FIGS. 1-5, the foot support assembly 42 is interconnected with the seat assembly as described in greater detail below such that when the seat assembly is placed into a horizontal sitting position, a front portion 54 of the foot support assembly 42 is lowered so as to contact the ground surface as illustrated in FIGS. 2 and 3. Thus, in this position, the foot support assembly 42 is inclined or sloped from the ground surface 55 to permit easier access by the user or operator as the operator enters the device 10. Moreover, the front portion 54 may be lowered so as to forcibly contact the ground surface 55 thereby removing some pressure from the front drive wheels as described below and thereby immobilizing or braking the device 10 as a user enters or exits therefrom.

A wheel mechanism is secured to the base portion 28 so as to permit movement and steering of the device 10 over the ground surface 55. In preferred form, a pair of independent drive wheels 56, 58 are positioned at the front end corners of the base assembly 28. Since each of the drive wheels 56, 58 is preferably identical in construction, only one such assembly will be so described. It is to be understood, however, that the description of one drive wheel 56 is applicable to the second drive wheel 58 both in this as well as in later described embodiments.

Referring particularly to FIG. 1, the drive wheel 56 includes a wheel member 60 interconnected to an electric motor 62. In the illustrated form of the invention, a drive chain or belt 64 is utilized to make this interconnection although other means such as direct drive linkage may be utilized. The motor 62 may comprise any available or appropriate drive mechanism and is preferably a standard wheelchair drive motor readily available in the market. The motor 62 moves the wheel 60 forwardly or rearwardly by appropriate rotation of the drive chain 64. A shroud 65 is provided to protect the mechanism of the wheel 56. The wheel 60 is interconnected to the base assembly 28 by a piston-like arrangement wherein the upper end of a connecting pin 66 is positioned for vertical movement within a receiving chamber 68 while connected at its lower end to wheel axle 69. A coiled spring 70 is disposed about the chamber 68 and pin 66 so as to bias or urge the pin 66 vertically outwardly from the chamber 68. However, due to the weight of the device 10, the pin 66 is normally maintained well within the chamber 68 and the spring 70 is maintained in compression. This arrangement remains in this condition so long as the ground surface 55 over which the device 10 is moving is flat. However, in the event that the ground surface 55 is uneven such that the wheel member 60 should come into contact with a dip or hole therein, the spring 70 automatically extends pin 66 so as to maintain the wheel 60 in continuous contact with the ground surface 55 despite the fact that the wheel 60 is in contact with an uneven surface. In preferred form, the amount of travel afforded to the pin 66 within the chamber 68 is approximately 2½ inches. Without this arrangement, if one wheel 56 should come into contact with a dip or hole, the wheel 56 could loose its traction with the ground surface 55 while wheel 58 continues to move, thereby causing the device 10 to unexpectedly tilt and/or turn.

A pair of freely rotating wheels 72 are attached to the rear portion of the base assembly 28. Each wheel 72 is mounted for free rotation about an axle 74 as well as mounted by a caster arrangement to a cylinder 76 so as to provide free pivotal movement therein. In this manner, support is provided to the rear of the device 10 to permit easy turning and movement thereof in response to the controlled drive movement of the front wheels 56, 58.

Referring now to FIGS. 1-5, the device 10 includes a seat assembly mechanism 80 which provides the walker embodiment of the present invention with many of its unique characteristics and capabilities. The seat assembly 80 includes a seat member 82 having a cushioned seat portion 84 disposed on the surface thereof. The cushion 84 may be any appropriate material for providing comfort to the user over a prolonged period of time. The seat member 82 is preferably substantially rectangular in shape and extends substantially the entire width of the device 10 between the vertical sides 14, 16. In addition, the seat member 82 includes an outwardly projecting lower back member 85 along the top portion thereof which is adapted for protecting and resting against the small of the back of the operator as illustrated particularly in FIG. 1. The lower back member 85 likewise has a cushion 86 thereon and is secured by a bracket 88 to the upper portion of the seat member 82. The lower back member 85 is adapted to move in conjunction with the movement of the seat member 82 as described below.

As previously indicated, the seat 82 is constructed so as to be able to move from a substantially horizontal position, as illustrated in FIGS. 2 and 3, to a substantially vertical or upright position as illustrated in FIGS. 1 and 4. In the embodiment illustrated in FIGS. 1-5, the term "substantially vertical or upright" is preferably defined to mean up to approximately 10 degrees short of true vertical relative to the horizontal plane of the base assembly 28. Moreover, the seat 82 is constructed so as to be able to move between a first horizontal position 90 located within the frame assembly 12 and a second horizontal position 92 wherein the seat 82 projects forwardly of the frame assembly 12.

Once the seat 82 is in position 92 so as to project forwardly through the entryway of the device 10, the seat 82 is readily accessible from in front of the device 10 so that a handicapped individual may easily transfer from a separate wheelchair or other device to the seat 82 without assistance and without undue effort. Once the individual is fully positioned on seat 82 in its second horizontal position 92, the seat 82 is then moved rearwardly to the position indicated at 90 so as to place the user in a seated position fully within the device 10. Then, as further described below, the occupant may secure certain portions of the device 10 to remain in a seated position or activate the seat 82 so as to move it to its substantially upright position as indicated in FIGS. 1 and 4.

Figure 5:
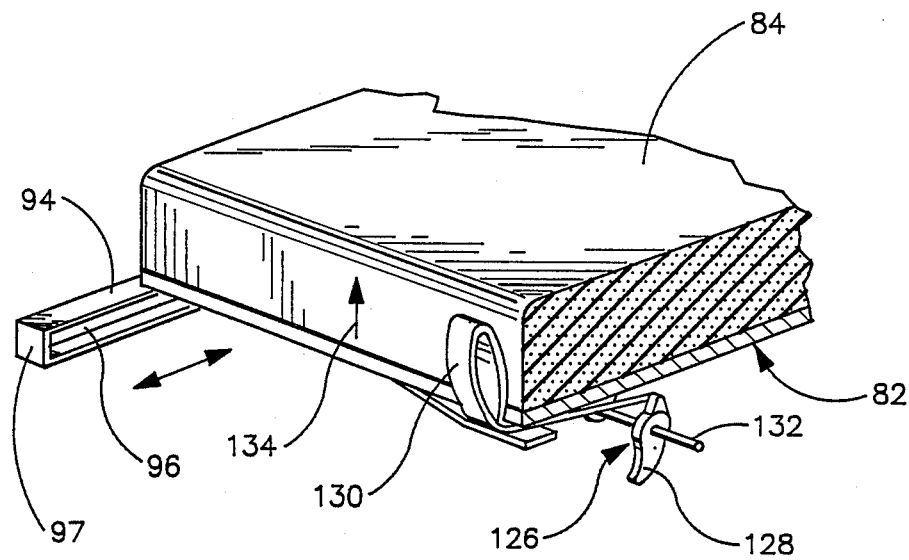
FIG. 5 is a perspective, partially sectional view of one seat construction utilizable with the embodiment of FIGS. 1-4.

To achieve the above seat movements, and with specific reference to FIGS. 2 and 5, the seat 82 is mounted within a pair of slotted brackets 94. The brackets 94 are interconnected crosswise at several locations to form a stable frame structure to hold the seat 82 firmly therewithin. The seat member 82 includes a pair of pins 95 that travel within the groove 96 formed within brackets 94 so as to permit the seat 82 to selectively travel along the length of the brackets 94. Pins 95 limit the movement of the seat 82 relative to the brackets 94 as illustrated in FIGS. 2 and 5. When the pins 95 are at the forward ends 97 of the brackets 94, the seat 82 is in its forwardly extending position 92. Likewise, when the pins 95 are at the rearward position of the brackets 94, the seat 82 is in its rearward horizontal position 90. Thus, movement of the pins 95 within the brackets 94 enables the seat 82 to move between the horizontal positions 90 and 92 as particularly illustrated in FIG. 2. It should be noted, however, that any seat movement arrangement may be utilized with the present invention so long as it enables the seat 82 to move between the indicated horizontal positions 90, 92.

To move the seat 82 between its two horizontal positions 90, 92, and its substantially vertical position as illustrated in FIGS. 1 and 4, a piston 100 is provided. The lowermost portion of one end of the piston 100 is pivotally connected at point 102 to a bracket 104 which is disposed at the rearward portion of the device 10 along the centerline thereof. The uppermost end of the piston 100 is pivotally connected at point 106 to the bottom portion of the seat 82. Extension and contraction of the piston 100 moves the seat 82 between its various horizontal positions 90, 92 and its vertical, upright position. Movement of the piston 100 is controlled by a control device 108 preferably mounted on the upper member 22 and operated by the user 26, as described in detail below. Power for operating the piston 100 is provided by the power-pack 34.

To assist in proper operation of the seat assembly 80, a pivot arm 110 is disposed on each side of the device 10. The bottom portions of each pivot arm 110 are pivotally mounted at point 112 to the rear vertical posts 20. The upper ends of pivot arms 110 are likewise pivotally mounted at point 114 to a single cross bar 116 which is secured beneath the forward portion of the brackets 94 (see FIG. 2). A second pair of pivot arms 118 are pivotally secured at one end 120 to the mid-portions of the arms 110 and are pivotally secured at their opposite ends to bottom brackets 122. The brackets 122 are in turn pivotally mounted at point 124 to the foot assembly 42. It is this connection from the seat assembly 80 with the brackets 124 that enables the forward portion of the foot assembly 42 to drop into contact with the ground surface 55 when the seat assembly 80 is moved to its horizontal positions 90, 92. This last aspect of the pivot arm connections, as previously indicated, is optional. In an alternate embodiment (not illustrated) the brackets 122 are eliminated and the brackets 118 connect directly to the assembly 42.

Referring in particular to FIGS. 2 and 5, a latch mechanism 126 is provided along the proximate centerline of the bottom portion of the seat 82. The latch mechanism 126 includes a hook arm 128 which is adapted for selective engagement with the cross bar 116. Likewise, a hand operable pull strap 130 is provided to rotate the hook arm 128 abouts its mounting bar 132. Thus, the latch assembly 126 is normally arranged so that the hook arm 128 is spring biased to engage the cross bar 116 if the seat 82 is moved from its horizontal position 90 toward its horizontal position 92. The engagement of the hook arm 128 with the cross bar 116 prevents movement of the seat 82 to its position 92. However, should the user desire so to move the seat 82 to its position 92, the strap 130 is pulled upwardly in the direction of arrow 134 to rotate the hook 128 out of engagement with the cross bar 116 and thereby allow the seat 82 to move forwardly to its second horizontal position 92. This interaction of the hook arm 128 with the bar 116 is essential to proper operation of the seat assembly 80.

Referring in particular to FIGS. 1 and 2, operation of seat assembly and movement of the seat 82 from its horizontal position 90 to either its second, forward horizontal position 92 or its vertical position occurs in the manner described below. Should the operator 26 desire to move the seat 82 from its position 90 to its vertically upright position, the piston assembly 100 is activated and extended. This extension of the piston 100 causes latch mechanism 126 to engage the cross bar 116. Since the latch mechanism 126 prevents further forward movement of the seat 82 beyond the bar 116, continued extension of the cylinder 100 forces the seat assembly 80 to lift along pivot points 114 and 106 so as to move the seat assembly 80 to its substantially vertically upright position as illustrated in FIG. 1. To lower the seat assembly 80 from its vertical position to the horizontal position 90, the cylinder assembly 100 is retracted until the seat 82 achieves its position 90.

Should the operator then wish to move the seat 82 from its horizontal position 90 to its second horizontal position 92 to permit entrance or exit from the device 10, the cylinder 100 is again extended. However, at this point the handle 130 is moved upwardly in the direction of arrow 134 so as to disengage the latch mechanism 126 from the cross bar 116. When this disengagement occurs, continued extension of the cylinder 100 will move the seat 82 along the brackets 94 until the seat 82 reaches its fully outwardly extended position 92. Once the latch mechanism 126 has passed over the cross bar 116, handle 130 may be released. To achieve movement of the seat 82 from position 92 to 90, the cylinder 100 is retracted. Since the hook arm 128 is curved as illustrated in FIGS. 2 and 5, movement of the seat 82 from its position 92 back to its first horizontal position 90 will automatically occur without using the strap 130. The curved portion of the hook arm 128 merely pushes across and over the cross bar 116, the spring bias arrangement permitting such rotation of the hook 128.

As soon as an individual 26 wishes to enter to the device 10, the seat assembly 80 is activated so as to move the seat to its outwardly projecting horizontal position 92. The operator of the device 10 then transfers onto the seat 82 and retracts the cylinder 100 so as to move the seat 82 to its first horizontal position 90. Once this position is achieved, the operator reverses operation of the cylinder 100 and extends the cylinder 100 until the latch mechanism 126 engages the cross bar 116, at which point the seat 82 moves to its upwardly standing position.

In order that the operator 26 may readily and firmly be maintained within the device 10, a gate mechanism 140 is provided. The gate mechanism 140 includes a gate member 142 having a thick foam padding 144 positioned thereon for engagement with the knees 146 of the operator 26 as indicated in FIG. 1. The gate member 142 is pivotally mounted by brackets 148 to one of the forward vertical posts 18. A ball member 150 and a latch member 152 are mounted on the opposite vertical post 18. Mounted on the free end of the gate 142 is a hook arm 154 for engagement with the latch 152 when the gate 142 is closed across the entryway 13, as clearly illustrated in FIG. 1 and FIG. 3. Likewise, disposed on the free end of gate 142 is a connecting member 156 having an aperture 158 therein which is sized and shaped to receive the ball 150. The ball 150 engages connecting member 156 to provide stability. Should the frame assembly 12 tend to become askew when moving over uneven ground, the connector 154 will not accidentally disengage the latch 152 and the gate 142 will remain closed due to the engagement between the ball 150 and the connector 156. This particular safety feature is important in that knees 146 of the user 26 will be firmly engaged against the inner surface of the gate 142 as illustrated in FIG. 1.

A safety strap or seat belt mechanism 160 is provided to encircle the operator 26. The seat belt 160 is secured to the seat 82 in any desired manner and is of a generally conventional seat belt design as, for example, frequently found in automobiles.

The control mechanism 108 may be of any desired type of mechanism capable of controlling power and operation of the cylinder 100 and the motors 62 for the driven wheels 56. In preferred form, control mechanism 108 includes a single toggle arm 162 which is utilized to control the direction of movement of the device 10. Two switches 164 and 166 are preferably provided. The switch 164 controls the high/low speed for the wheels 56, while the switch 166 will control the lift/drive mechanism for the seat assembly 80 by controlling extension or contraction of the cylinder 100. As illustrated in FIG. 3, the control mechanism 108 may be pivotally mounted to the cross arm 22 so that the control member 108 may be moved away from the operator 26 as desired. Moreover, the control member 108 can be moved to the opposite cross arm 22 depending on whether the operator wishes a left or right hand control. It should also be noted that the control mechanism 108 may comprise a chin control or blow control device in the case of a quadriplegic operator 26. Such devices are presently available in the market for use with power wheelchairs.

For convenience, a writing or utility tray 168 may be pivotally mounted on the opposite arm 22 from the control switch 108. The tray 168 is mounted so that it may be readily pivoted away as indicated in FIG. 3 as desired.

To summarize use and operation of the device 10, the seat 82 preferably projects at least approximately 50% of its depth outwardly beyond the frame assembly 12 when in its position 92. Moreover, the height of the seat 82 above the ground surface in its position 92 is generally approximately the same as a standard wheelchair or other chair height. Therefore, an operator or user 26 may readily transfer from a sitting position in some other device to the seat 82 in its horizontal position 92. At this point, the user 26 may preferably connect the seat belt mechanism 160 about the waist in order to securely and firmly position himself on the seat 82. It should be emphasized that most users or operators 26 will have absolutely no use or control of their leg muscles. Thus, the present invention is specifically designed and intended for use by such individuals without outside assistance. Once the seat belt mechanism 160 is so attached, toggle switch 166 is activated to retract the cylinder 100 and move the seat 82 to its inner or first horizontal position 90. Once this position 90 is achieved, the gate 142 is closed so as to engage the connector 154 with the latch 152 and the ball 150 within the connector 156. The frame assembly 12 is sized and shaped so that the operator 26 may be in a fully sitting position with seat 82 in its position 90 and the gate mechanism 140 in either its closed or open position.

At this juncture, the operator 26 may then move himself to a standing position without utilizing or requiring any muscle control of his legs by engaging the switch 166 and extending the piston 100. As the piston 100 extends and the latch mechanism 126 engages the cross bar 116, the seat 82 gradually lifts upwardly to its substantially vertical position as indicated in FIGS. 1 and 4. In this maximum upright position, the seat 82 is preferably approximately 10 degrees off vertical. As the seat 82 moved from its horizontal position 92 to its upright position, the knees 146 of the operator 26 engage the inner soft surface of the gate 142. Thus, the contact points wherein the weight of the operator 26 is distributed and leveraged include primarily the operator's knees and buttocks/upper legs with some weight distributed to the feet. Once the operator 26 is in a fully upright position as indicated in FIG. 1, the weight of the operator 26 tends to firmly yet comfortably maintain and wedge the operator 26 in position between the gate 140 and the seat 82. In this position, the operator 26 may readily operate the high/low speed switch 164 as well as the toggle drive on 162 to easily move the walker 10 along the ground surface 55. Due to the independent drive arrangement of the wheels 56, the walker 10 is very mobile with a short turn radius.

In preferred form, the width of the walker device 10 in its outermost dimensions is approximately 2 feet. This enables the operator 26 to readily move through any standard door opening, which is quite unlike standard power wheelchairs or other walker devices presently available. Moreover, not only will the operator 26 sustain the advantages of being in a standing position within the device 10 as described previous hereto, but the operator may readily shift his weight to a wide variety of relative positions between his feet, knees and buttocks/upper legs by moving the seat 82 to any desired position from its fully upright position and its fully horizontal position 90. Moreover, should the operator 26 wish to take a rest from standing, he may simply lower the seat 82 to its horizontal position 90 without having to open the gate mechanism 140 or otherwise alter the arrangement of the device 10. This continuous shifting of weight enables the user 26 to increase comfort as well as safety.

In operating the device 10 over a ground surface, the spring loaded independent action of the wheels 56 enables the walker device 10 to remain steady and in firm ground contact with the ground even when operated over an uneven surface. Moreover, since the weight of the device 10 is carried very low, the low center of gravity keeps the device 10 very stable even though its width dimension is small compared to prior art devices. Additionally, since the only portion of the device 10 immediately directly in front of the operator 26 is the gate mechanism 140, the operator 26 who is in a standing position within the device 10 may move immediately adjacent a work surface, which permits the operator 26 virtually a full arm extension across any work surface. This is unlike prior art devices which carry a great deal of equipment in the front portion of the walker. Such bulkiness in the front of prior art walkers severely limits the arm reach capability of the user of the walker.

Another distinct advantage of the design of the present invention illustrated in FIGS. 1–5 that since the gate mechanism 140 is the only item positioned between the operator 26 and the front of the device, and since this gate mechanism 140 is disposed very low relative to the operator 26 in a standing position, the operator is psychologically not part of the device 10. Thus, not only does the device 10 enhance access to a working surface, but it also increases the psychological fitness of the operator since he is not confronted with a bulky machine immediately in front of him which limits his access to a working surface. It should also be noted that, as previously described, since the weight distribution of the device 10 is low and to the rear, there is very little danger of the device 10 tipping forwardly even though there is very little in the way of machine immediately forward of the operator in an upright position within the device 10.

Referring now to the embodiment illustrated in FIGS. 6–12, a wheelchair 200 is illustrated which has the capability of functioning both as a wheelchair, wherein the operator is capable of moving the apparatus 200 about a ground surface when in a fully seated position, as well as as a walker wherein the operator is capable of moving the apparatus 200 about a ground surface when in a fully upright or standing position similar to that illustrated in FIGS. 1–5. It is to be understood that while the embodiment illustrated in FIGS. 6–12 is a preferred power wheelchair/walker arrangement, other embodiments are envisioned within the scope of the present invention such as a manually operable wheelchair combined with a power walker seating arrangement or even a fully manually operable wheelchair/walker embodiment.

In order to fully function as both a power wheelchair device as well as a power walker device, the apparatus 200 incorporated a number of modifications as compared to the walker illustrated in FIGS. 1–5. Specifically, the preferred apparatus 200 includes a frame 202 having a base portion 204 and spaced side portions 206 and 208 which define a space 209 for receiving an operator in a fully seated position. A front entryway is further defined at the forward portion of the frame 202 between the side portions 206, 208. The base portion preferably includes a housing 210 wherein battery packs are housed for providing power to the apparatus 200 as in FIGS. 1–5 as well as common to other power wheelchair assemblies. A foot support tray 212 is provided to firmly engage and contain the feet of the operator when in device 200.

The frame 202 preferably includes a pair of side bar members 214, 216 which are interconnected crosswise by members not illustrated as well as by the tray 212 and housing 210. In addition, each bar 214, 216 includes a vertical front post 218, 220 and a vertical rear post 222, 224, respectively. Each front post 218, 220 is interconnected to its respective rear post 222, 224 at the upper portions thereof by upper side bars 226, 228 respectively. The upper ends of the rear vertical posts 222, 224 are likewise interconnected crosswise by a generally U-shaped bumper post 230 which is designed not only to interconnect the side portions 206, 208 at the rear end of the apparatus 200 but also to act as a bumper guard to protect the inner components of the base portion 204. In addition, the U-shaped bumper post 230 and the upper side bars 226, 228 function as an attachment for a shroud 232 which is adapted to surround the side and rear portions of the base portion 204 to protect the working mechanisms thereof as well as to improve the general overall appearance of the apparatus 200.

Referring particularly to FIGS. 6–12, a pair of drive wheels 234 and 236 are preferably provided at the bottom portion of the front vertical posts 218, 220 respectively. The drive wheels 234, 236 are arranged and assembled similar to the drive wheels 56 of the embodiment illustrated in FIGS. 1–5. In addition, freely rotatable rear wheels 238 are provided at the rear end portion of the bottom side bars 214, 216. The rear wheels 238 are sized and constructed in a manner similar to the freely rotatable castered rear wheels 72 of the embodiment illustrated in FIGS. 1–5. Thus, further details concerning these features will not be repeated and described, for like numbers will indicate like parts and functions. However, wheel shrouds 240 are preferably provided to cover and protect the forward edges of the drive wheels 234, 236. It should be noted that the electric motor 62 provided for each drive wheel 234, 236 is oriented horizontally instead vertically as in FIGS. 1–5. This orientation is simply to provide a more compact arrangement for the components of base portion 204.

A seat assembly mechanism 242 is provided having a seat member 244 for receiving the buttocks of an operator, and a seat back 246 utilized to support the back portion of an operator disposed within the seat assembly 242. The lowermost end portions of the seat back 246 are preferably pivotally connected to rear brackets 248 which are disposed at the rearmost ends of the seat member 244.

Figure 9:
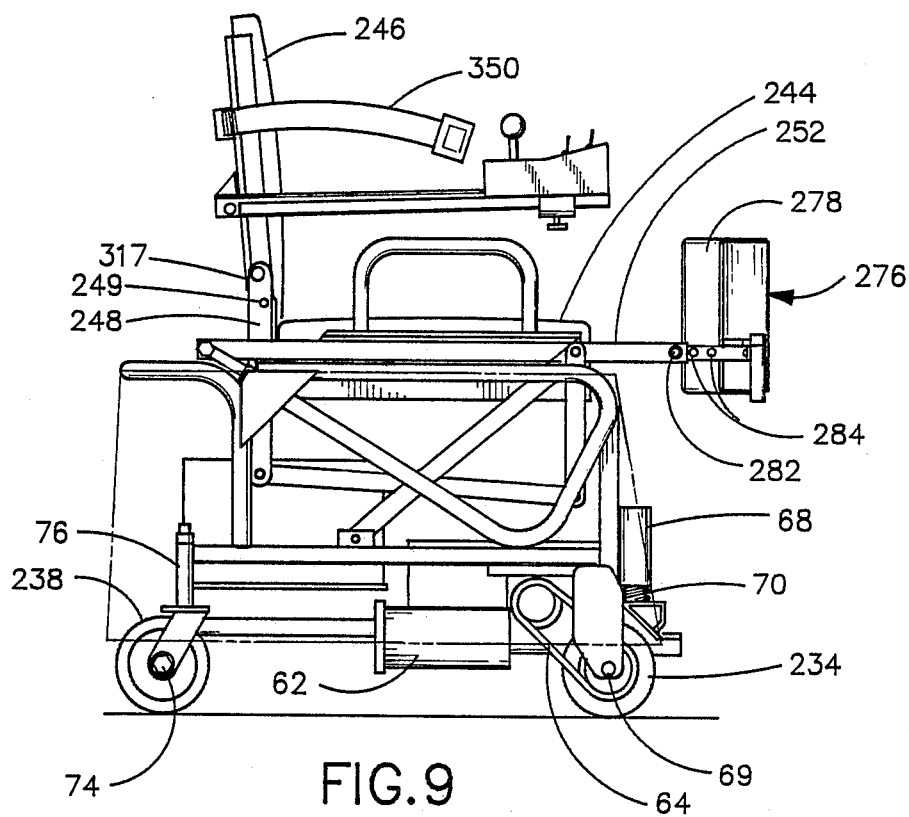
FIG. 9 is a side perspective view of the embodiment of FIG. 8 with the seat back in its unfolded, vertical alignment for use as a wheelchair device.
Figure 10:
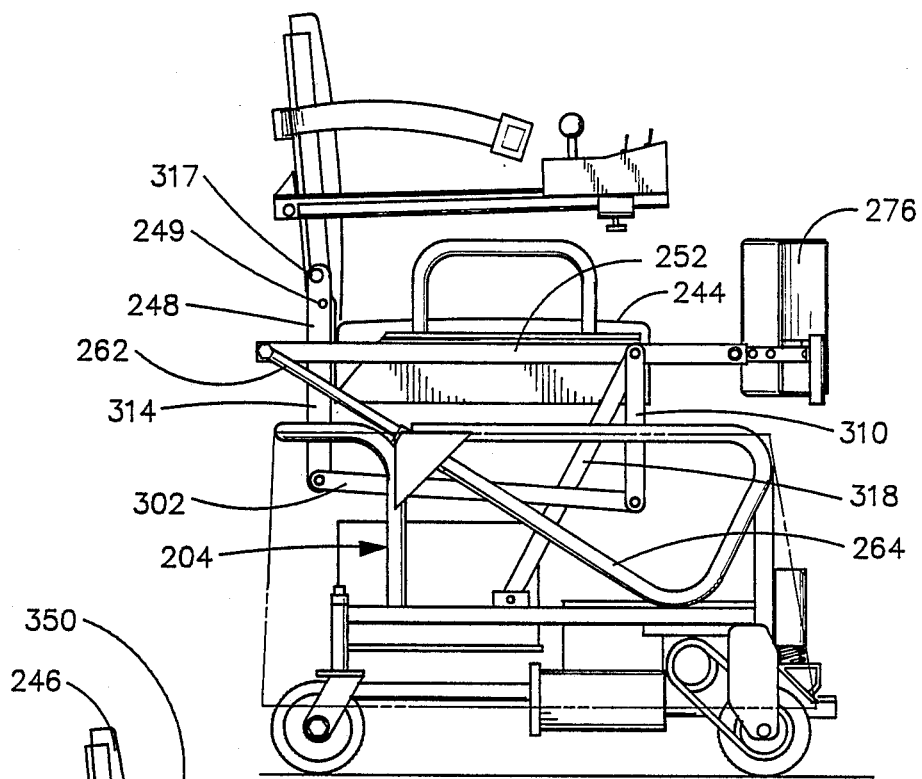
FIG. 10 is a side perspective view of the embodiment illustrated in FIG. 9 and illustrating the seat assembly thereof in a second, raised horizontal position.

A first frame assembly 250 is provided and connected to the seat assembly 242. The first frame assembly 250 is adapted to move the seat member 244 in a vertical or upwardly direction while retaining the seat member 244 in a substantially horizontal position in order to adjust for the height and size of an operator. This is more clearly illustrated in FIGS. 9 and 10. FIG. 9 illustrates the first and lowermost horizontal position of seat 244 while FIG. 10 illustrates the second and uppermost horizontal position of seat 244. In this instance, the upper or second horizontal position is disposed both verticaly upwardly from the first lower horizontal position of FIG. 9 as well as disposed rearwardly relative to the base portion 204 as compared to the first horizontal position of FIG. 9.

To achieve this simultaneous vertical and rearward movement, the first frame assembly 250 includes a pair of side members 252, 254 interconnected along their rear end by a crossbar 256. The forward edge of the seat member 244 is pivotally connected toward the forward end portions of the side members 252, 254 as illustrated using pivot pin 258. The rear end portion of each side member 252, 254 is pivotally connected by a pin 260 to a telescoping rod 262 which is oriented angularly downwardly and forwardly toward the bottom side bar members 214, 216. Each rod 262 is disposed for telescoping movement within a tube 264 which angularly interconnects the rear portion of the upper side bars 226, 228 with the forward portion of the bottom side bar members 214, 216, respectively. Thus, the tube 264 acts as a sleeve for the piston-like movement of the rod 262 as the frame members 252, 254, 256 are moved vertically between the two horizontal positions illustrated in FIGS. 9 and 10. However, due to the angular relationship of the rod 262 and the tube 264 relative to the frame members 252, 254 and 256, as the first frame assembly 250 moves vertically upwardly, the frame assembly 250 is likewise moved rearwardly relative to the base portion 204. Thus, the rod 262 and sleeve 264 act as guides and supports for the first frame assembly 250.

Movement of the first frame assembly 250 is controlled by a first control piston 266 which interconnects the center portion of the rear crossbar 256 with the bottom of the base portion 204. Movement of the piston 266 is preferably controlled by the power mechanism disposed within the housing 210 as well as the control lever mechanisms 342 and 348 as more particularly described below. Moreover, the angular relationship of the piston 266 relative to the plane defined by the bottom side bar members 214, 216 is the same as the angular relationship of the rod 262 and sleeve 264 relative to the same plane, which angular relationship is variable depending upon the desired amount of rearward movement relative to the desired upward vertical movement. Thus, movement of the rods 262 within the sleeves 264 is identical to the movement of the piston portion 268 within the piston sleeve 270, with movement of the first frame assembly 250 thereby being controlled by appropriate movement of the first piston 266.

A pair of brackets 272 and 274 project from the forward ends of the frame side members 252, 254 and are disposed for adjustable forward/rearward movement within the frame members 252, 254. A gate member 276 is pivotally mounted to the end of the bracket 272 and includes a thick interior cushion 278 which is arranged for firm yet comfortable engagement against the knees of an operator when the operator is positioned within the apparatus 200. A spring-loaded latch mechanism (not illustrated) of any known and desired design may be utilized at the other end of the gate 276 for engagement with the bracket 274 to firmly position and secure the gate mechanism 276 across the entryway of the apparatus 200. It should be noted, however, that the latch mechanism may be selectively disengaged so as to pivotally swing the gate mechanism 276 away from the entryway allowing easy operator movement into or out of the apparatus 200. Moreover, the hinge connection of the gate 276 with the bracket 272 preferably includes a gate pin member 278 engaged within a bracket socket portion 280 wherein the pin 179 and gate member 276 may be lifted entirely out of engagement with the socket 280 and thereby readily remove the gate mechanism 276 from the entryway entirely. When the pin 279 is engaged within the socket 280, the weight of the gate 276 automatically maintains the gate mechanism 276 in pivotal position as illustrated and desired.

As indicated above, the brackets 272 and 274 are forwardly and rearwardly adjustable within frame side members 252, 254. To achieve this adjustability, a pin member 282 passes through the side members 252, 254 and may engage any one of a plurality of apertures 284 disposed along each bracket 272, 274. In this manner, the position of the gate mechanism 276 may be adjusted within the horizontal plane of the first frame assembly 250 so as to adapt the location of the gate mechanism 276 to the size of the operator positioned within the apparatus 200. This adjustment is preferably made so as to insure firm yet not uncomfortably tight engagement of the gate mechanism 276 with the knees of the operator when positioned within the apparatus 200.

Figure 6:
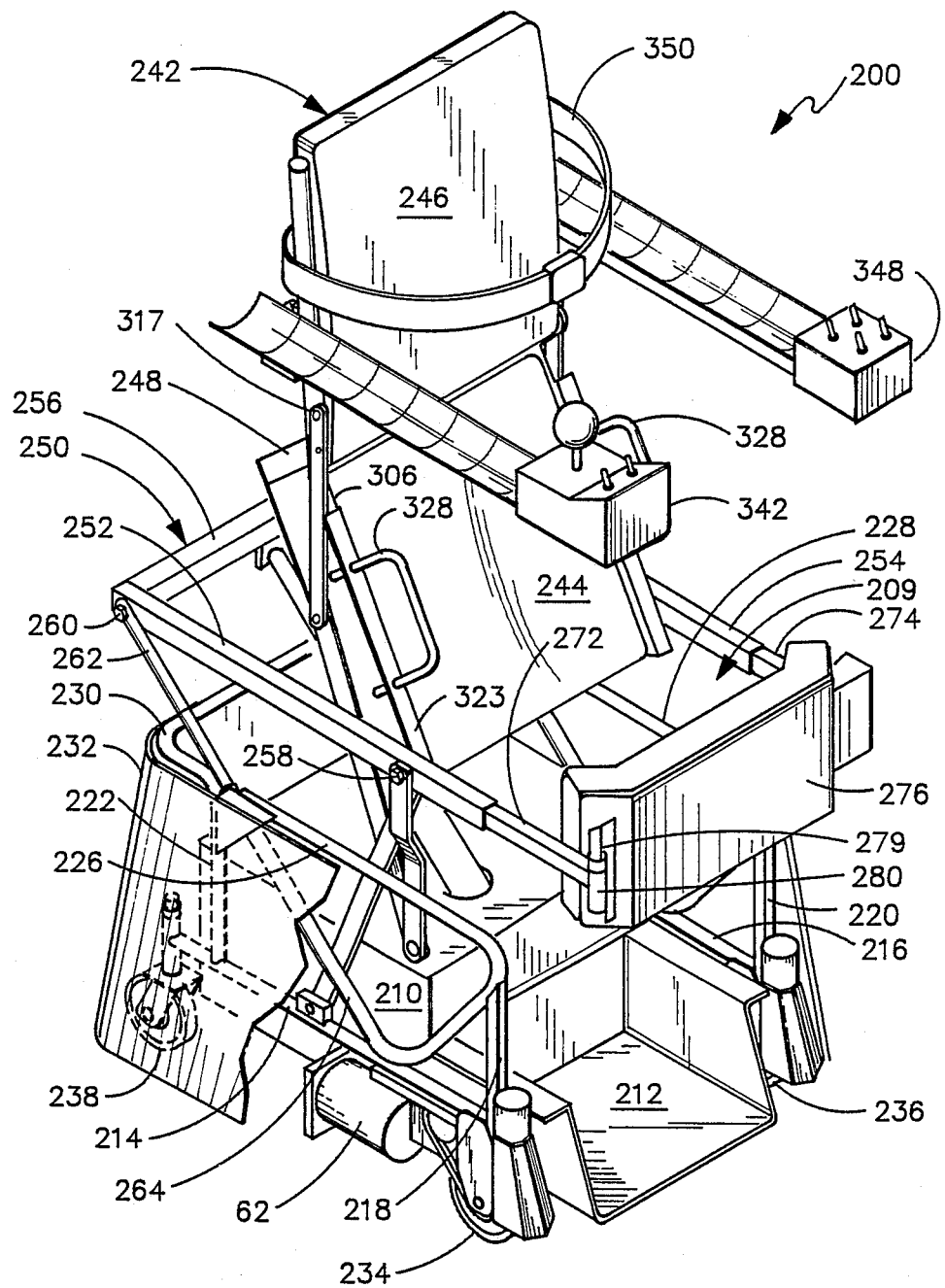
FIG. 6 is a perspective view of a wheelchair/walker combination device of the present invention illustrating the device in a full upright position functioning as a walker.
Figure 7:
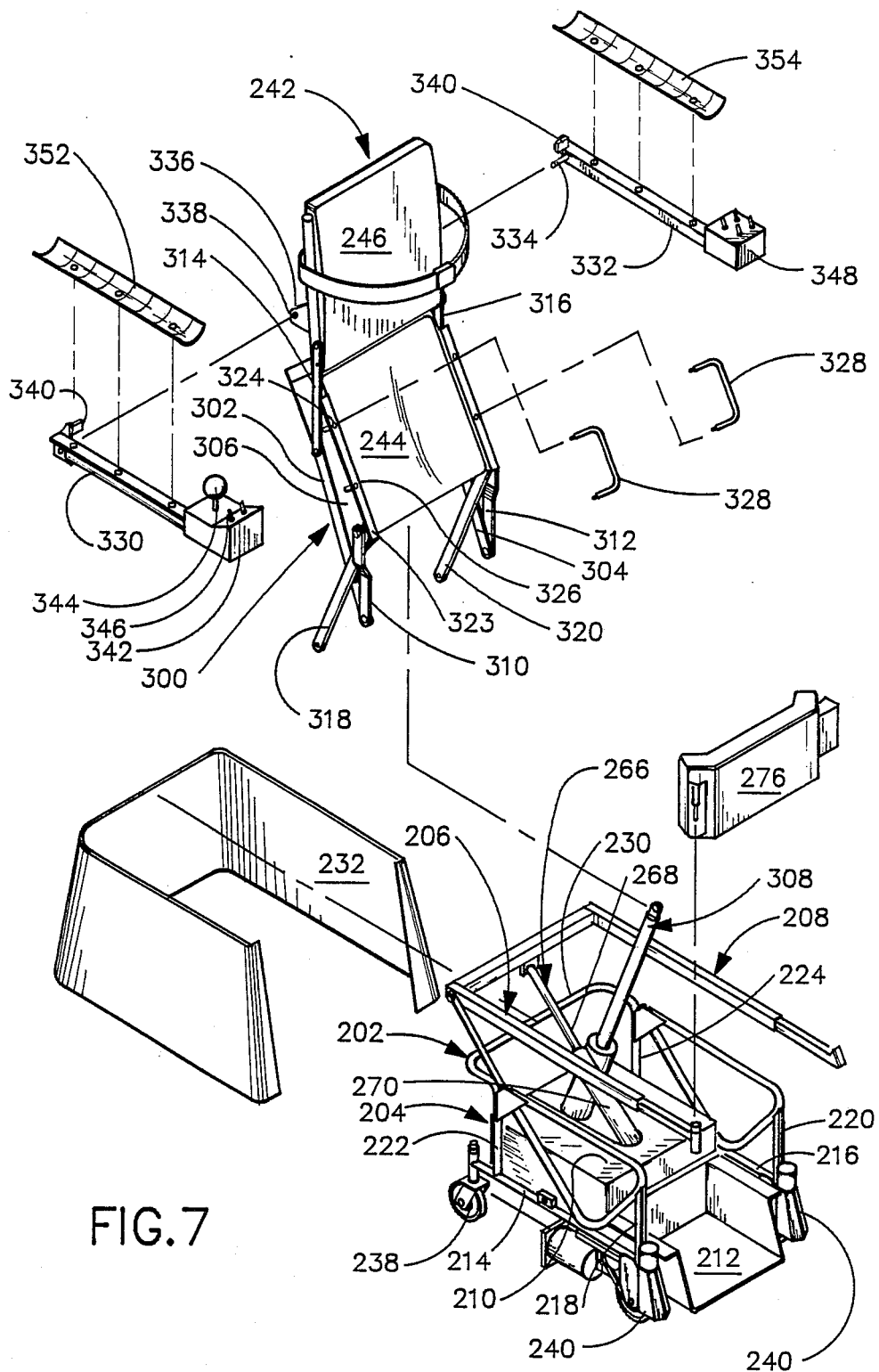
FIG. 7 is an exploded view of the embodiment illustrated in FIG. 6.

Referring now in particular to FIGS. 6 and 7, a second frame assembly 300 is provided and utilized for moving the seat assembly 242 from a horizontal position wherein the operator is in a fully seated position, to a generally upright position so that the operator is maintained in a standing position within the apparatus 200 so that the apparatus 200 may function as a walker device. The frame 300 preferably includes a pair of frame arms 302 and 304 spaced below the seat member 244 and generally parallel with the side edges thereof, although such parallelism may be modified as necessary to obtain the appropriate and desired angulation of the seat assembly 242. In preferred form, the seat member 244 includes side brackets 306 which contain the cushion of the seat 244 and beneath which the frame arms 302, 304 are positioned. As previously indicated, the forward edge of the seat 244 is pivotally secured at pivot pins 258 to the first seat assembly side members 252, 254, and a second piston member 308 is secured proximate the center of the bottom of seat 244. One end of the piston 308 is attached to the bottom of the seat 244 and the other end thereof is attached to the base portion 204 and passes through the housing 210 similar to the first piston 266. The angulation of the second piston member 308 is generally opposite of that of the first piston member 266 so that as the piston member 308 is extended, the piston member 308 raises the seat 244 and pivots it about the pivot pins 258. Thus, as the pistom 308 is extended, the seat 244 tilts forwardly from its forward edge.

A particular problem with this design is to insure that the seat back member 246 remains substantially vertical throughout the entire raising and tilting movement of the seat 244 to its fully upright position at approximately 60°–75° from the horizontal as illustrated in FIGS. 6 an 12. If the seat back member 246 does not remain substantially vertical throughout this movement, then the sheer forces against the back of the operator seated within the apparatus 200 may become unacceptable, and the operator will furthermore not be maintained in a fully upright orientation. In order to maintain the vertical orientation of the seat back 246 and to minimize or eliminate the sheer forces, the second frame assembly 300 includes a pair of first vertically oriented connector rods or brackets 310, 312 which are secured at their uppermost ends to the pivot pins 258 and are secured at their lowermost ends to the forward ends of the frame arms 302, 304. These first vertically oriented connector rods 310, 312 are designed to remain stationary relative to frame arms 302, 304 in a substantially vertical orientation. In addition, a pair of second vertically oriented connector rods or brackets 314, 316 are connected at their lowermost ends to the opposite rearwardly disposed ends of the frame arms 302, 304. The upper ends of the second connector rods 314, 316 are connected by pins 317 to the lower side portions of the seat back member 246. The pins 317 engage the seat back 246 at a position disposed vertically above the pivot point between the seat back 246 and the brackets 248. The second connector rod 314, 316 are also designed to remain substantially vertical in orientation during movement of the seat assembly 242.

Finally, the second frame assembly 300 also includes a pair of brackets 318, 320 which connect at their uppermost ends to the pivot pins 258. The lowermost ends of brackets 318, 320 are pivotally connected to the central portions of the bottom side bar members 214, 216 of the base frame 202. Thus, as the seat member 244 is raised by action of the piston 308 and pivoted about pivot pins 258, a scissors-like movement occurs between the brackets 318, 320 and the frame arms 302, 304, with the frame arms 302, 304 travelling along with the seat member 244. Thus, a parallelogram is generally formed between the seat member 244, the frame arms 302, 304, and the first and second connector rods 310, 312 and 314, 316. It is this interaction between the connector rods 310, 312 and 314, 316 in conjunction with the frame arms 302, 304 and the support brackets 318, 320 which permit the seat back member 246 to remain vertical throughout the entire range of movement of the seat 244.

Figure 11:
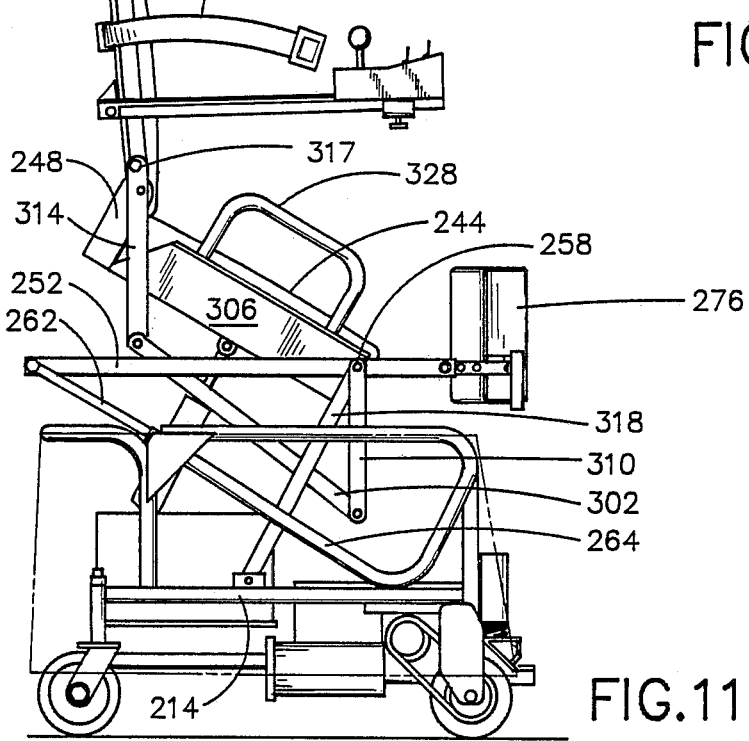
FIG. 11 is a side perspective view of the embodiment illustrated in FIG. 10 illustrating the seat assembly in a partially upstanding position.
Figure 12:
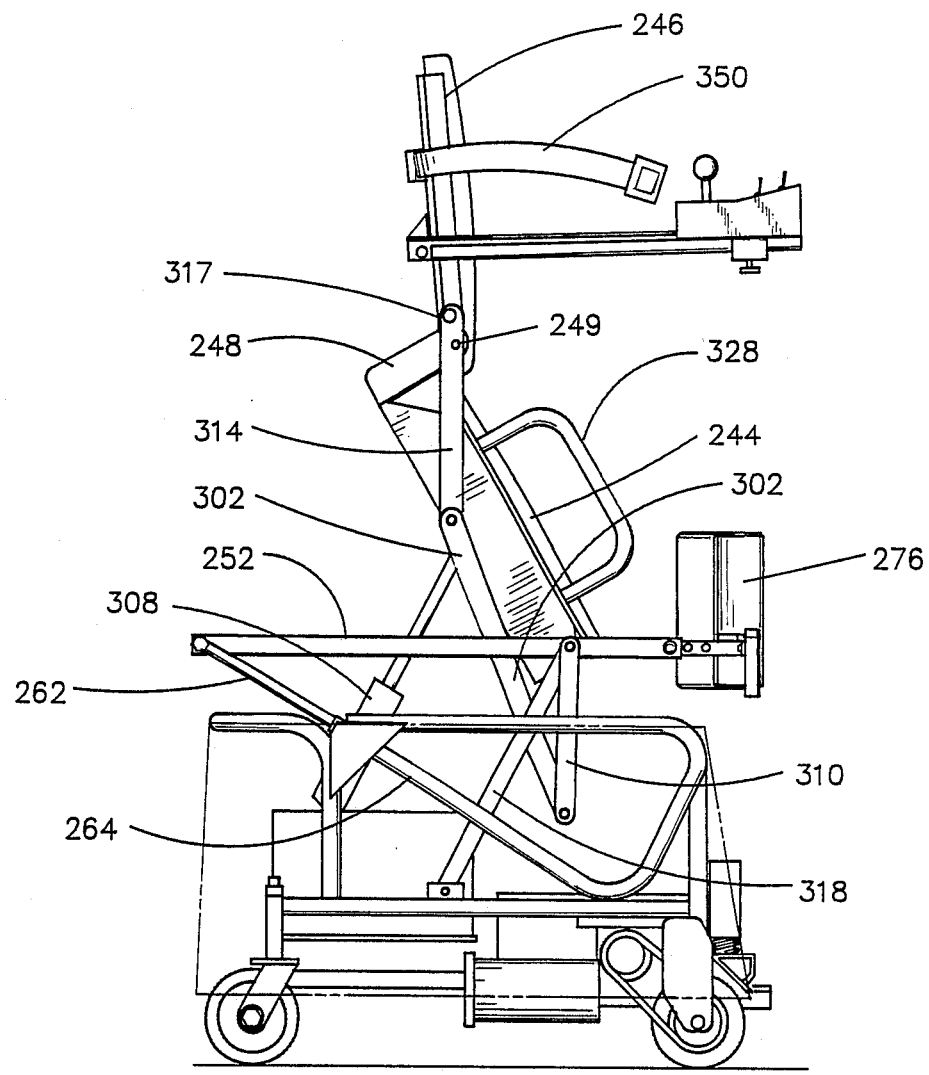
FIG. 12 is a side perspective view similar to that of FIG. 11 but illustrating the embodiment thereof in a fully upright position functioning as a walker.
Figure 13:
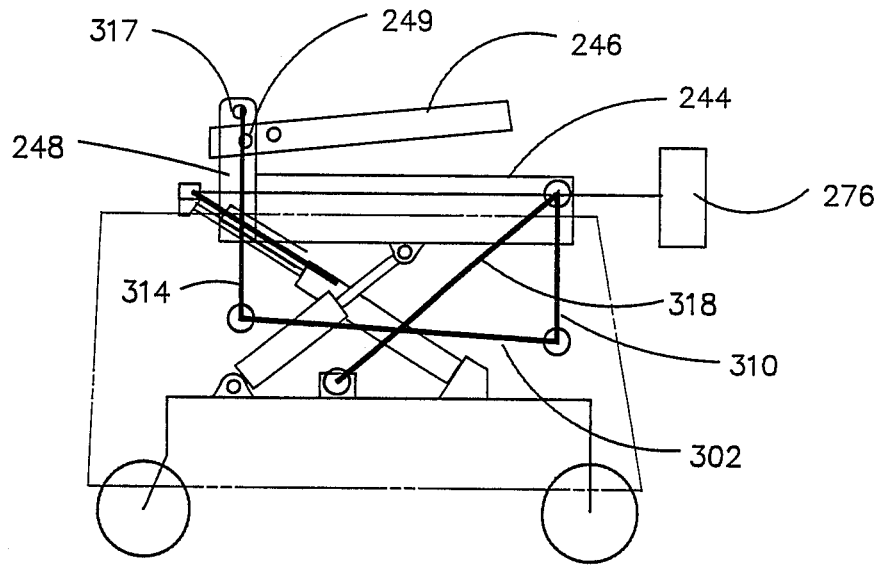
FIG. 13 is a side schematic similar to that of FIG. 8 and illustrating the seat operating components thereof.

This raising movement of the seat member 244 is particularly illustrated in FIGS. 10-12 wherein the piston 308 begins to raise the seat member 244 in FIG. 11 and completes its movement in FIG. 12 wherein the seat 244 is fully raised to approximately 60°-75° from the beginning horizontal position illustrated in FIG. 10. In this manner, an operator positioned within the apparatus 200 is wedged slightly between the engagement of his knees against the gate mechanism 276, his buttocks against the seat 244 and his feet against and onto the foot rest 212. In this particular apparatus 200, however, the wedging action of the knees against the gate mechanism 276 is not as great as in the embodiment illustrated in FIGS. 1-15. Thus, significantly more weight is placed upon the feet of the operator and onto the foot rest 212, with much of the weight of the operator being taken off the buttocks and shifted to the legs and feet to aid in circulation as well as significant weight shifting, which matters are previously described. Moreover, when the device 200 is sized so that the operator can be a child, such weight shifting to a child's legs and feet is extremely important to insure proper growth of the child's legs. Without such weight loading, a child's leg growth tends to be stunted.

In preferred form, the side brackets 306 which contain the cushion of the seat member 244 includes flange 323 having a pair of apertures 324, 326 which are adapted to recieve the ends of handles 328. The handles 328 are sized and shaped to fit snugly into the apertures 324, 326. It should be noted, however, that the handles 328 are designed to be readily moved to enable an operator to simply slide sideways from the side of seat 244 onto another chair or piece of furniture instead of having to move outwardly through the entryway defined by the gate mechanism 276. In addition, the gate mechanism 276, as previously discussed, is removable from the first frame assembly 250 to also permit such easy sliding movement onto or off of the wheelchair/walker apparatus 200.

In preferred form, the device 200 is power driven. In this instance, the operation of the pistons 266 and 308 are powered by the power mechanism, preferably rechargeable batteries, contained within the housing unit 210. Moreover, the operation of the pistons 266 and 308 as well as the drive wheels 234, 236 are controlled by the control lever mechanisms 342, 348 mounted on a pair of removable arm members 330, 332. Each arm member 330, 332 preferably includes a pin 334 which is extendable within a bracket 336 mounted on the rear of the back support 246. The pin 334 engaging within the aperture 338 of the bracket 336 allows the arm members 330, 332 to be pivoted upwardly to permit an operator to slide on and off the seat 244. Stop members 340 are also disposed on the rear ends of the arms 330, 332 to insure that the arms 330, 332 will remain substantially horizontal in their downward position as illustrated in FIG. 6 by engagement with the rear portion of the back support member 246.

Disposed at the distal ends of the arms 330, 332 are the controls for use by the operator in moving the apparatus 200 about a ground surface by controlling the drive wheels 234, 236 as well as controlling the operation of the seat assembly 242. These controls can be of any desired and selected arrangement and can also include chin skin contact controls as well as puff and blow controls typically utilized in power wheelchair devices by quadriplegics. In the illustrated embodiment, the control member 342 is disposed at the distal end of the arm 330 and includes a toggle control 344 for operating and engaging the drive wheels 234, 236 as well as speed switches 346. Raising and lowering of the pistons 266 and 308 are controlled by a second control device 348 which is preferably disposed on the distal end of the arm 332. Thus, the operation of the drive wheels 234, 236 and thus the movement of the apparatus 200 over a ground surface is controlled independent from the raising and lowering of the seat assembly 242 and, in the illustrated embodiment, can be performed simultaneously with raising or lowering of the operator from a fully seated position as illustrated in FIGS. 9 and 10 to a fully upright position as illustrated in FIGS. 6 and 12. In the preferred embodiment, movement of the piston 266 and thereby movement of the seat 244 from its lower horizontal position illustrated in FIG. 9 to its upper rearward horizontal position illustrated in FIG. 10 cannot occur simultaneously with operation of the piston 308. Thus, in the preferred form, the operator of the apparatus 200 must select the most comfortable vertical level of the seat 244 in its horizontal position depending upon the length of the operator's legs. Once this position is selected, the operator may then readily raise or lower the seat 244 from a fully seated position to a fully upright position or any position therebetween as desired. This raising and lowering can be done simultaneously with operating the drive wheels 234, 236, thus allowing the operator to move up and down while simultaneously moving the apparatus 200 about a ground surface. In addition, a chest belt 350 is provided for use by the operator if desired. However, it is envisioned that such chest belt 350 would only be preferably utilized by an operator who was quadriplegic and therefore without muscle control over his arms to thereby support himself along the arm members 330, 332. In addition, the preferred embodiment includes curved trays or other similar armrests 352, 354 which may be mounted along the upper surface of the arms 330, 332 to provide comfort for the operator.

Figure 8:
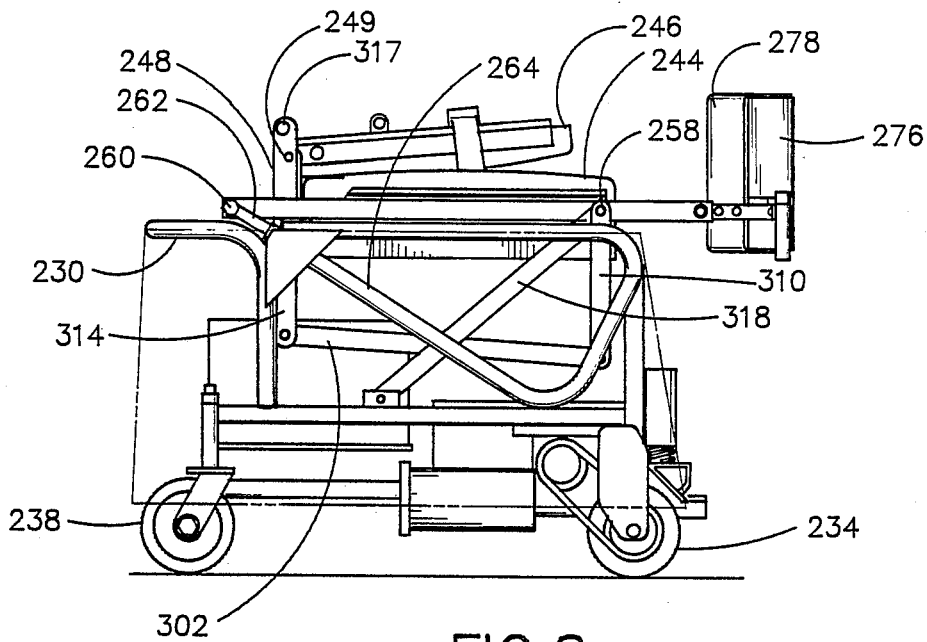
FIG. 8 is a side perspective view of the embodiment of FIG. 6 with the device in a fully seated position and the seat back in a folded condition for transportation.

As illustrated in FIG. 8, the seat back member 246 may be folded down upon the seat 244 to permit collapse of the apparatus 200 for transportation. To achieve this movement, the pin members 317 which engage the upper ends of the second vertically oriented connector rods 314, 316 with the seat back member 246 are removed from engagement with the seat back 246 thereby allowing the seat back 246 to be pivotally folded along the pivot connection 249 with the brackets 248. In this preferred form, the apparatus 200 may be folded to a total height of 24″ while having a depth ranging between 21–24″. Moreover, the seat height of the seat member 244 above the ground surface may range from 20–24″ depending upon movement and positioning of the piston 266. This permits the apparatus 200 to be readily adjusted for a wide range of operator height.

Figure 14:
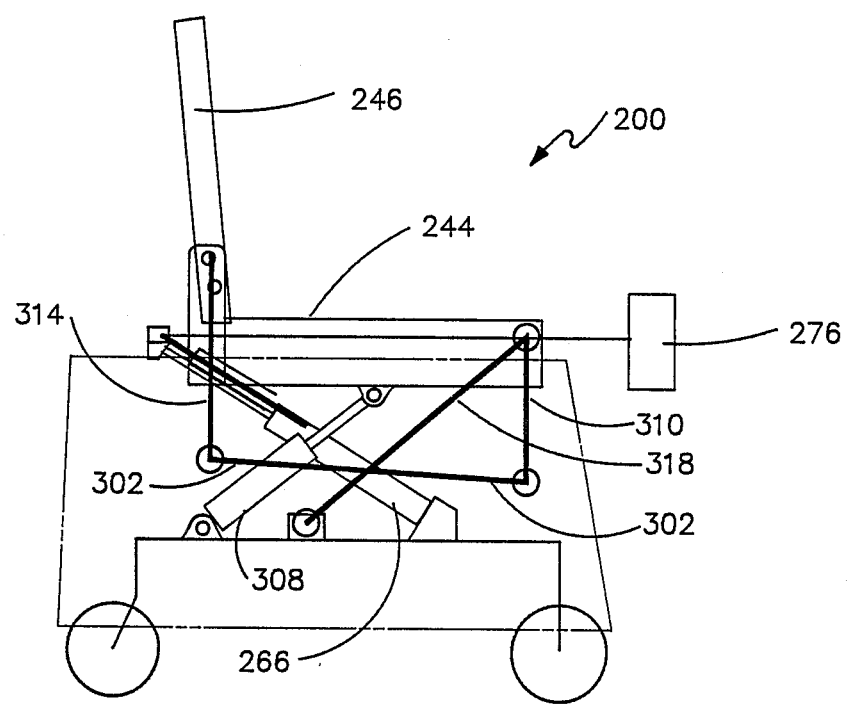
FIG. 14 is a side schematic similar to that of FIG. 9 illustrating the seat operating components thereof.
Figure 15:
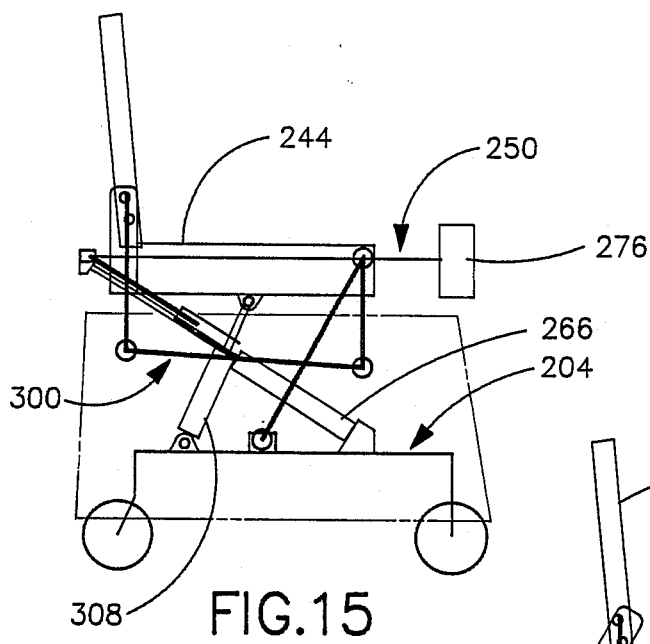
FIG. 15 is a side schematic similar to that of FIG. 10 illustrating the seat operating components thereof.
Figure 16:
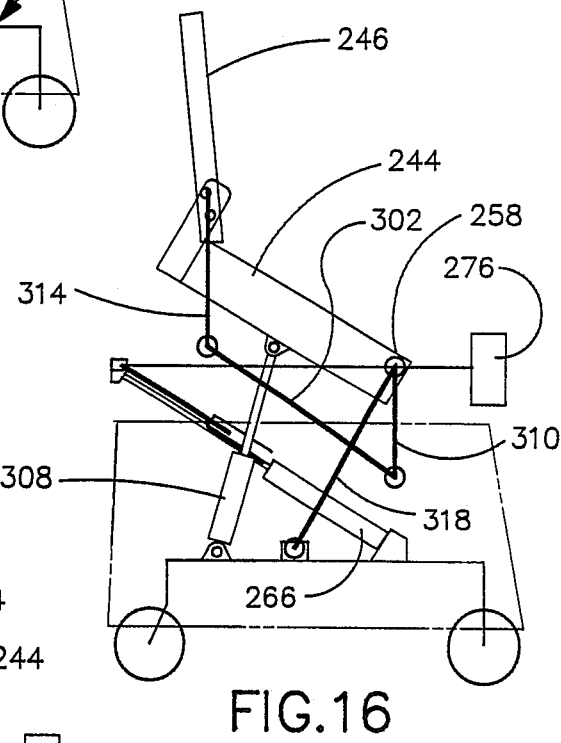
FIG. 16 is a side schematic similar to that of FIG. 11 illustrating the seat operating components thereof.
Figure 17:
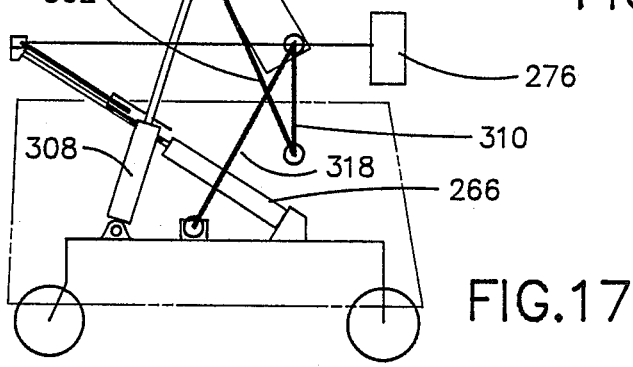
FIG. 17 is a side schematic similar to that of FIG. 12 illustrating the seat operating components thereof.

Referring now to FIGS. 13–17, the schematics illustrated therein more clearly illustrate the operation of the various components of the apparatus 200. As can be seen from FIG. 13, the seat back member 246 may be folded down on top of the seat 244 by pivoting along pivot pin 249 in bracket 248. FIG. 14 illustrates the apparatus 200 with the seat back member 246 in its fully upright position and the seat member 244 in it lowermost horizontal position. In order to raise the seat member 244 to its uppermost horizontal position as illustrated in FIG. 15, the first piston 266 must be activated to extend the same. When this occurs, the entire first and second frame assemblies 250 and 300 are raised relative to the base portion 204. In addition, the seat 244 is moved rearwardly relative to the base portion 204 due to the interaction of the pins 262 within the tubes 264 which run parallel with the piston 266. Since the gate mechanism 276 moves vertically and rearwardly with the first frame assembly 250, the actual height of the gate mechanism 276 may not be as great as the embodiment illustrated in FIGS. 1–5 since the position of the end of the seat 244 relative to the gate mechanism 276 does not change with raising or lowering of the seat 244 between its first and second horizontal positions.

When it is desired to stand the operator into an upright position, the second piston 308 is engaged and extended to raise the rearmost end of the seat 244 and pivot the seat 244 about the pivot pin 258. As can be seen from FIGS. 16 and 17, the first and second vertically oriented connector rods 310 and 314 remain substantially vertically oriented so as to maintain the same relative position between the seat back portion 246 and the base 204. Thus, the back of the operator will be continuously supported by the backrest member 246 while the weight of the operator will be shifted from the seat 244 to primarily the feet of the operator with some weight being carried through a wedging relationship between the operator's knees against the gate mechanism 276 and the buttocks against the seat 244. As can also be clearly seen, while the operator will be firmly maintained within the apparatus 200 in an upright position by the triangular relationship between the foot support 212, the gate mechanism 276 and the seat 244, there is very little in the way of machine disposed about the upper torso portion of the operator. Thus, the psychological effect is that the operator will have even less connection with the apparatus 200 as with the walker described in FIGS. 1–5. Nonetheless, even though there is very little in the way visible support to the upper torso of the operator, the operator is nonetheless firmly secured within the apparatus 200, for approximately 80% of the weight will be transferred to the front drive wheels 234, 236 thereby providing significant control over the apparatus 200 in the upright position.

As can be seen from the above, the present invention provides a wheelchair/walker combination apparatus which permits an operator to easily move into and out of the device without additional assistance. Moreover, the powered device enables an operator with absolutely no leg muscle use or control to move between a fully seated and a fully upright position thereby permitting the operator to change relative weight distribution between his feet, knees, thighs and hips without assistance. This ability to change and shift weight distribution is both physically and psychologically beneficial to the operator and will enable the operator to remain within the motorized wheelchair/walker for extended periods of time. The device of the present invention enables the operator to move the device with good maneuverability in tight operating conditions as well as over uneven ground surface without loosing traction or stability thereof from either a fully seated position or from a fully upright position. Thus, the present invention has the capability of functioning fully as a wheelchair as well as a powered walker.

It will be understood that while an illustrative and presently preferred embodiment of the invention has been described in detail herein, the inventive concepts may be otherwise variously embodied and employed and that the appended claims are intended to be construed to include such variations except insofar as limited by the prior art.

We claim:

1. A wheelchair apparatus comprising:
   frame means having a base portion and spaced side portions to define a space for receiving an operator's body;
   means for supporting said frame means above a ground surface for movement therealong and including means for moving said apparatus over said ground surface;
   means to permit an operator within said space to control movement of said apparatus along said ground surface; and
   seat assembly means for supporting and selectively moving an operator between a fully seated position and a substantially upright position within said apparatus to permit said operator to control and move said apparatus over said ground surface from both said fully seated position and said substantially upright position;

wherein said seat assembly means includes seat means, seat back means, and seat control means to maintain said seat means and said seat back means in position to support said operator in said fully seated position, in said substantially upright position and in any operator-selected position therebetween; and wherein said seat means includes means to selectively and continuously move said seat means between a first substantially horizontal position and a second substantially horizontal position which is vertically upwardly disposed relative to said first horizontal position, when said operator is in said fully seated position.

2. The wheelchair apparatus as claimed in claim 1, wherein said seat back means remains substantially vertical relative to said seat means as said seat means is moved between said first and second horizontal positions.

3. The wheelchair assembly as claimed in claim 1, wherein said seat means includes pivot means disposed along its forward edge to tilt said seat means forwardly and raise an operator disposed thereon to a substantially standing, upright position.

4. The wheelchair assembly as claimed in claim 3, wherein said seat back means remains substantially vertical with minimal sheer against the back of an operator as said seat means is tilted and said operator is raised to said standing position.

5. The wheelchair assembly as claimed in claim 3, wherein said apparatus further includes gate means adapted to selectively extend across a front entryway defined by said spaced side portions to provide a closure mechanism when said operator is in said apparatus and to provide a front contact and support mechanism for the knees of said operator when in a standing and substantially upright position, said gate means being attached to move with said seat means between said first and second horizontal positions.

6. The wheelchair apparatus as claimed in claim 5, wherein said gate means comprises a single gate member pivotally secured to one said side portion for pivotal movement within a substantially horizontal plane and includes means for attachment to the oppositely spaced side portion when in a closed position, said gate member including means for adjustment within said horizontal plane relative to the front of said apparatus to adjustably accommodate the leg height and size of an operator.

7. The wheelchair apparatus as claimed in claim 1, wherein said seat means includes pivot means disposed along its forward edge to tilt said seat means forwardly and raise an operator to a substantially standing, upright position from any selected position between the first and second horizontal positions of said seat means.

8. The wheelchair apparatus as claimed in claim 7, wherein said movement control means includes said power means adapted to be activated by said operator to selectively move said apparatus over a ground surface independent of, and including simultaneous with, the tilting of said seat means and the vertical movement of said seat means between said first and second horizontal positions.

9. A wheelchair apparatus comprising:

frame means having a base portion and spaced side portions to define a space for receiving an operator's body;

means for supporting said frame means above a ground surface for movement therealong and including means for moving said apparatus over said ground surface;

means to permit an operator within said space to control movement of said apparatus along said ground surface; and seat assembly means for supporting and selectively moving an operator between a fully seated position and a substantially upright position within said apparatus to permit said operator to control and move said apparatus over said ground surface from both said fully seated position and said substantially upright position;

wherein said seat assembly means includes seat means, seat back means, and seat control means to maintain said seat means and said seat back means in position to support said operator in said fully seated position, in said substantially upright position and in any operator-selected position therebetween;

wherein said seat means is selectively moveable between a first substantially horizontal position and a second substantially horizontal position which is vertically upwardly disposed relative to said first horizontal position when said seat assembly means is in said fully seated position;

wherein said seat control means includes a first control arm assembly mounted to move said seat means between said first and second horizontal positions while simultaneously moving said seat means rearwardly relative to said base portion as it moves said seat means to said second horizontal position.

10. A wheelchair apparatus comprising:

frame means having a base portion and spaced side portions to define a space for receiving an operator's body;

means for supporting said frame means above a ground surface for movement therealong and including means for moving said apparatus over said ground surface;

means to permit an operator within said space to control movement of said apparatus along said ground surface; and seat assembly means for supporting and selectively moving an operator between a fully seated position and a substantially upright position within said apparatus to permit said operator to control and move said apparatus over said ground surface from both said fully seated position and said substantially upright position;

wherein said seat assembly means includes seat means, seat back means, and seat control means to maintain said seat means and said seat back means in position to support said operator in said fully seated position, in said substantially upright position and in any operator-selected position therebetween;

wherein said seat means is selectively moveable between a first substantially horizontal position and a second substantially horizontal position which is vertically upwardly disposed relative to said first horizontal position when said seat assembly means is in said fully seated position;

wherein said seat means includes pivot means disposed along its forward edge to tilt said seat means forwardly and raise an operator to a substantially standing, upright position, from any selected position between the first and second horizontal positions of said seat means;

wherein said seat control means includes a first power control assembly connected to said base portion to selectively move said seat means between said first and second substantially horizontal positions, and a second power control assembly connected to said base portion to selectively pivot and tilt said seat means along its forward edge, said first and second power control assemblies being adapted for independent activation and movement.

11. The wheelchair assembly as claimed in claim 10, wherein said first power control assembly comprises an exterior frame member secured to said seat means and adapted to move said seat means in a generally vertical and rearward direction between said first and second substantially horizontal positions, a first piston member secured between said base portion and said exterior frame member and adapted to control said vertical and rearward movement of said frame member and seat means, and pivot arms pivotally secured to said base portion and each forward edge of said seat means so as to assist in maintaining said seat means in a substantially horizontal position as said seat means moves vertically upwardly and rearwardly from said first to said second substantially horizontal position in response to said first piston member.

12. The wheelchair apparatus as claimed in claim 10, wherein said second power control assembly comprises a frame assembly including a pair of frame arms spaced below and substantially parallel with the side edges of said seat means, a pair of first vertically oriented connector rods connecting the front ends of said frame arms with the forward edges of said seat means, a pair of second vertically oriented connector rods pivotally interconnecting the rearward ends of the said frame arms with the lowermost ends of said seat back means, and a second piston member pivotally interconnecting said base portion with said seat means and adapted to move the rearward end of said seat means in a generally vertical direction to pivot and tilt said seat means about said pivot means defined by said seat means and said first vertically oriented connector rods.

13. The wheelchair apparatus as claimed in claim 12, wherein the side edge of one side of said seat means, the frame arm disposed below said side edge, the first connector rod interconnecting said side edge with said frame arm, and the second connector rod interconnecting said frame arm with said seat back means are arranged generally in the form of a parallelogram and remain generally in the form of a parallelogram as said seat means is raised and lowered about said pivot means.

14. In a wheelchair apparatus having a frame, means for selectively moving said frame over a ground surface, and seat means for receiving an operator to permit the operator to control and move said apparatus from a fully seated position therein, the improvement comprising seat assembly means for supporting and selectively moving an operator between said fully seated position and a substantially upright position within said apparatus to permit the operator to control and move said apparatus over a ground surface from both said fully seat position and said substantially upright position;

wherein said seat assembly means further includes power means to selectively raise and lower said seat means to any desired position between a first substantially horizontal position and a second substantially horizontal position elevated relative to said first horizontal position to adjust said seat means in accordance with the size, height and comfort of said operator while said operator remains positioned in said seat assembly means.

15. In a wheelchair apparatus having a frame, means for selectively moving said frame over a ground surface, and seat means for receiving an operator to permit the operator to control and move said apparatus from a fully seated position therein, the improvement comprising seat assembly means for supporting and selectively moving an operator between said fully seated position and a substantially upright position within said apparatus to permit the operator to control and move said apparatus over a ground surface from both said fully seated position and said substantially upright position;

wherein said seat assembly means further includes means to selectively raise and lower said seat means between a first substantially horizontal position and a second substantially horizontal position elevated relative to said first horizontal position to adjust said seat means in accordance with the size and height of said operator;

wherein said means for raising and lowering said seat means is adapted such that said second horizontal position is disposed rearwardly relative to said first horizontal position.

16. In a wheelchair apparatus having a frame, means for selectively moving said frame over a ground surface, and seat means for receiving an operator to permit the operator to control and move said apparatus from a fully seated position therein, the improvement comprising seat assembly means for supporting and selectively moving an operator between said fully seated position and a substantially upright position within said apparatus to permit the operator to control and move said apparatus over a ground surface from both said fully seated position and said substantially upright position;

wherein said frame includes means defining a front entryway and gate means for selectively closing said entryway and abutting the knees of an operator disposed on said seat means, said gate means providing support to the legs of said operator in cooperation with said seat assembly means as said operator is raised from said fully seated position to said substantially upright position without requiring independent leg muscular control by said operator; and wherein said frame is disposed at and below the level of said gate means to provide a nominal barrier exterior to said operator when in a raised, upright position.

* * * * *

UNITED STATES PATENT AND TRADEMARK OFFICE
CERTIFICATE OF CORRECTION

PATENT NO. : 4,809,804
DATED : March 7, 1989
INVENTOR(S) : Thomas T. Houston and Raymond H. Metzger It is certified that error appears in the above—identified patent and that said Letters Patent is hereby corrected as shown below:

In the "Related U.S. Application Data" section, delete "19" and insert therefor --25--.

Column 3, line 29, delete "wheehchair" and insert therefor --wheelchair--.

Column 11, line 42, between "5" and "that" insert --is--.

Column 11, line 64, delete the second occurrence of "as".

Column 12, line 60, between "instead" and "vertically" insert --of--.

Column 18, line 15, between "way" and "visible" insert --of--.

Column 22, line 3, delete "seat" and insert therefor --seated--.

Signed and Sealed this

Twenty-ninth Day of August, 1989

Attest:

DONALD J. QUIGG

Attesting Officer

Commissioner of Patents and Trademarks